United States Patent [19]
Kanigowski

[11] Patent Number: 5,340,286
[45] Date of Patent: Aug. 23, 1994

[54] BALANCED TURBOCHARGER

[76] Inventor: Wojceich Kanigowski, 13782 Phyllis Pl., Garden Grove, Calif. 92645

[21] Appl. No.: 607,557

[22] Filed: Oct. 29, 1990

[51] Int. Cl.$^5$ ............................................. F04B 17/00
[52] U.S. Cl. .................................................. 417/407
[58] Field of Search ........................ 417/405, 406, 407

[56] References Cited

U.S. PATENT DOCUMENTS

| | | |
|---|---|---|
| 1,197,755 | 9/1916 | Möller ................................. 417/406 |
| 3,199,772 | 8/1965 | Leutzinger ........................... 417/405 |

FOREIGN PATENT DOCUMENTS

| | | |
|---|---|---|
| 0093924 | 7/1980 | Japan ................................... 417/406 |

*Primary Examiner*—Richard A. Bertsch
*Assistant Examiner*—Timothy S. Thorpe

[57] ABSTRACT

A combination turbine and air compressor apparatus comprises a housing having first and second air inlet and first and second compressed air outlets, an operating gas inlet, and an operating gas outlet. Ends of a turbine-air compressor shaft are rotatably mounted in bearings mounted in the housing. A turbine wheel is fixed to central regions of the shaft intermediate the operating gas inlet and outlet. First and second symmetrical air compressors are fixed to the shaft on opposite sides of the turbine wheel with the compressors in air flow communication with corresponding ones of the air inlets and pressurized air outlets. Walls internal to the housing divide a flow of operating gas, such as exhaust gases from an internal combustion engine, entering the gas inlet into first and second gas sub-flows and direct the first gas sub-flow to one peripheral region of the turbine wheel, and the second gas sub-flow to the opposite peripheral region of the turbine wheel, the two sub-flows impinging the turbine wheel in a manner balancing the loads on the turbine wheel and shaft bearings and in directions causing the turbine wheel to rotate in the rotational direction which causes air flowing into the two housing air inlets to be compressed by the two compressors and to be delivered thereby to the two pressurized air outlets.

12 Claims, 4 Drawing Sheets

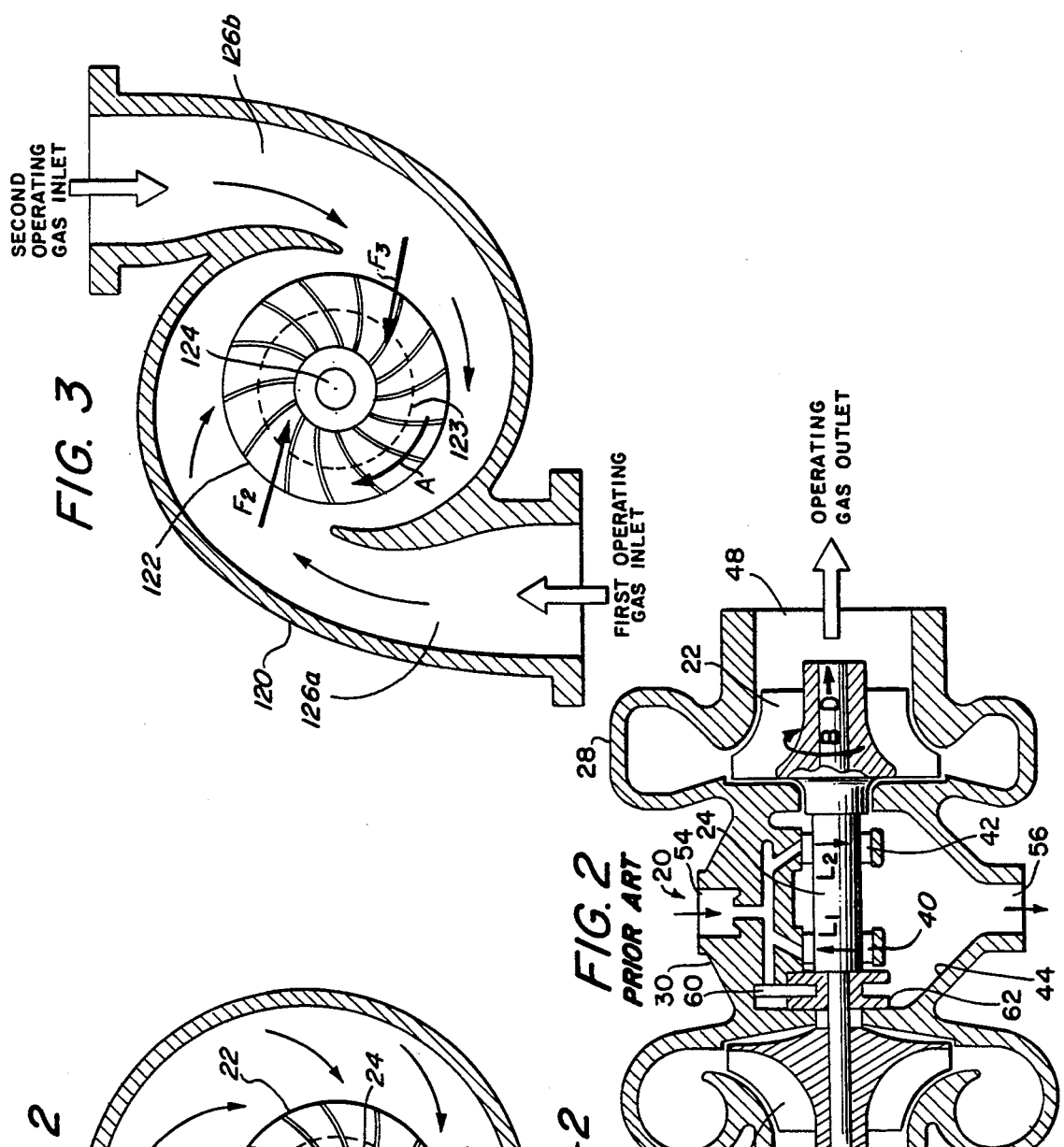

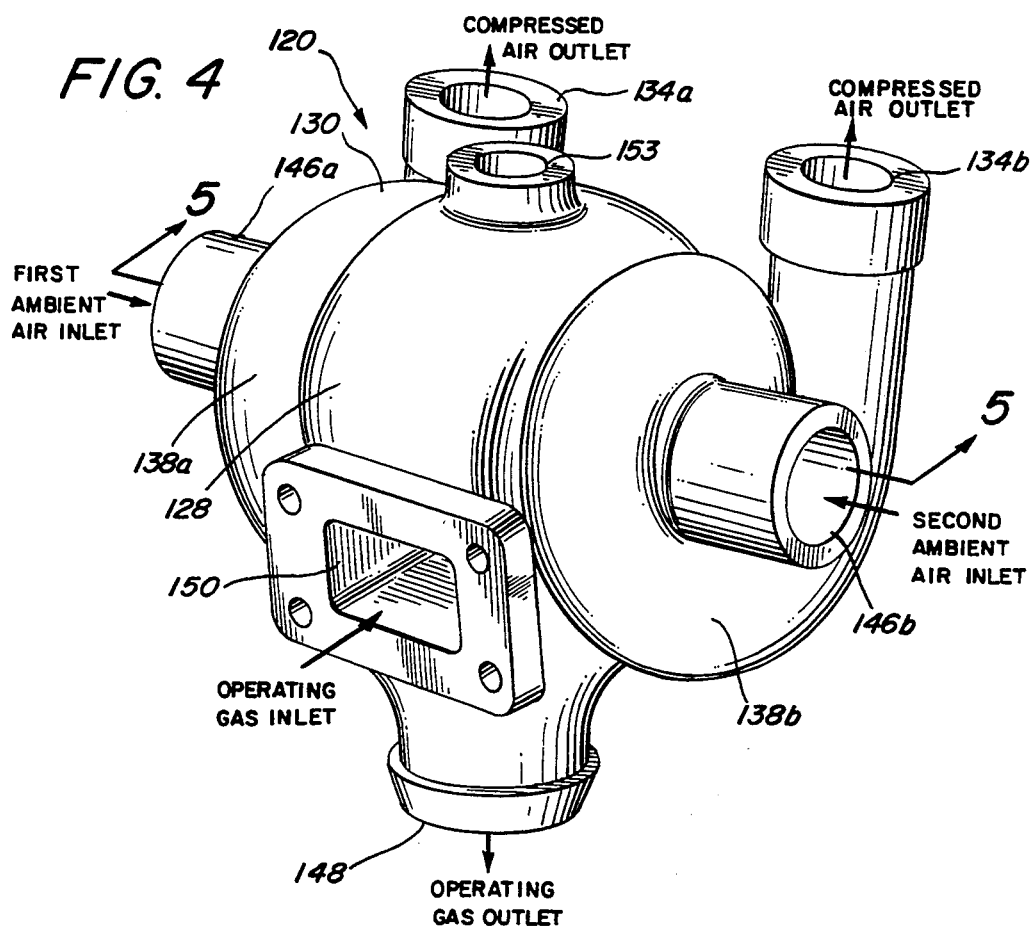
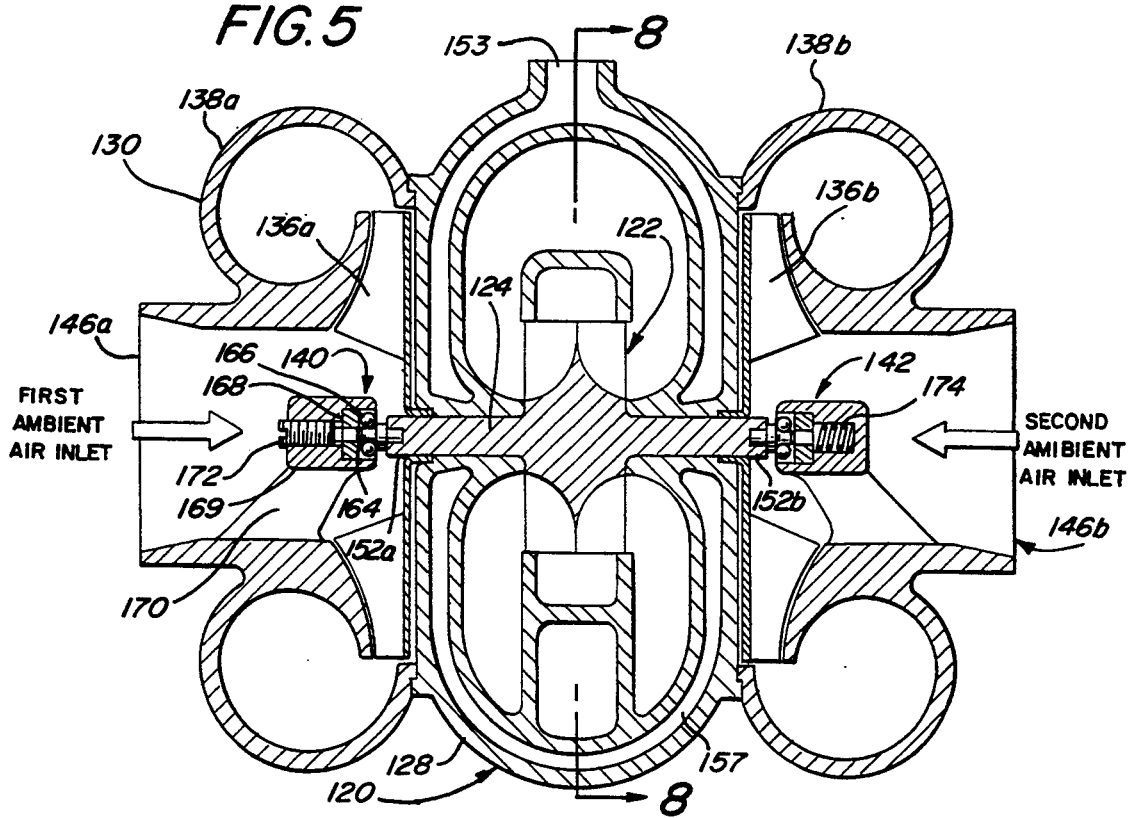

BALANCED TURBOCHARGER

BACKGROUND OF THE INVENTION

1. Field of the Invention

The present invention relates generally to the field of turbines, and, more particularly, to the field of turbine-driven air compressors or turbochargers, as they are often called.

2. Background Discussion

Turbines are widely used for many purposes. As an example, water-driven turbines are used, in turn, to drive electric generators for the generating of electricity. Combustion types of turbines are used to power all manner of jet and turboprop aircraft, and similar types of turbines are used to drive ships. In experimental automobiles, gas turbines have been used as a source of motive power in place of conventional internal combustion engines.

Moreover, in combination with internal combustion engines, turbine-driven air compressors are used to force more air than is otherwise provided by conventional air intakes into the engines, thereby enabling the engines to develop more horsepower than would otherwise be possible by a non-turbocharged engine of the same cubic inch or cubic centimeter (cc) displacement. In this regard, such turbine-driven air compressors, also often called turbochargers or just turbos, are widely used on trucks, sports cars and ever increasingly on passenger automobiles to enable the use of smaller and lighter weight engines than would otherwise be possible. This, in turn, enables automobiles to have smaller engine compartments and be lighter in weight so as to achieve the high mileage now being required of autos.

Turbine-driven compressors for vehicles and the like typically comprise a shaft-mounted turbine wheel of a bucket or vane type. Fixed to the turbine shaft is an air pump or air compressor. Such turbos are connected to the automobile engine and exhaust system so that exhaust gases from the engine are directed to the turbine wheel to cause the rapid spinning thereof. Intake air is directed to the air compressor portion of the turbocharger, the rotation of the turbine by the engine exhaust gases causing the intake air to be compressed. The output of the air compressor is connected to air intake regions of the engine fuel-air feeding system so that the compressed air is fed thereto. The turbo is preferably oil lubricated and water cooled to maintain it at a safe operating temperature which is within the capabilities of the various components, such as bearings, within the turbocharger.

Because of the hostile, exhaust gas environment inside such turbos, their reliability tends to suffer and the requirement for frequent maintenance and/or repair is not uncommon. As might be expected, the turbine shaft support bearings are subject to wear as a result of the high temperatures and high speeds at which they are operated, as well as the eccentric loading on them caused by the manner in which the exhaust gases and compressed air flow within the turbochargers.

As a result of this and other problems associated with conventional turbos used for vehicles and the like, the present inventor has invented an improved turbocharger in which the radial and axial loads on the turbine shaft support bearings are substantially reduced, thereby increasing the operational life of the turbochargers and improving their reliability. Alternatively, or in addition, such an improved turbocharger can be operated at higher operating stresses than conventional turbochargers of similar size and capacity. In addition, such an improved turbocharger does not require engine oil for lubrication and can be operated in any position, even upside down in aircraft.

SUMMARY OF THE INVENTION

In accordance with the present invention there is provided a combination turbine and air compressor apparatus which comprises a turbine-air compressor housing having at least one air inlet, at least one pressurized air outlet, at least one operating gas inlet, and at least one operating gas outlet. Included is a turbine-air compressor shaft which is journaled for rotation in the housing and a turbine wheel which is fixed to the turbine-air compressor shaft for causing the rotation thereof, the turbine wheel being disposed within the housing intermediate the at least one operating gas inlet and the at least one operating gas outlet. Further comprising the apparatus are air compressor means which are fixed to the turbine-air compressor for rotation therewith, the air compressor means being disposed within the housing for receiving air from the at least one housing air inlet and for providing pressurized air to the at least one compressed air outlet.

Operating gas flow means are provided for directing a first flow of operating gas to one peripheral region of the turbine wheel and for directing a second flow of operating gas to the opposite peripheral region of the turbine wheel. The operating gas flow means cause the first and second flows of operating gas to impinge the turbine wheel in directions causing the turbine wheel to rotate in the rotational direction which causes air flowing into the at least one housing air inlet to be compressed by said air compressor means and to be delivered thereby to the at least one housing compressed air outlet.

In accordance with a preferred embodiment of the invention, the housing includes first and second air inlets and first and second compressed air outlets. In such case, the air compressor means correspondingly comprise first and second air compressor wheels, the first compressor wheel being fixed to the turbine-air compressor shaft to one axial side of the turbine wheel in air flow communication with the first air inlet and first compressed air outlet and the second air compressor wheel being fixed to the turbine-air compressor shaft on the other axial side of the turbine wheel in air flow communication with the second air inlet and second compressed air outlet. It is additionally preferred in such case that the first and second air compressors are shaped symmetrically relative to one another and are fixed to the turbine-air compressor shaft symmetrically relative to the turbine wheel.

In accordance with another aspect of the preferred embodiment, the housing includes a single operating gas inlet and a single operating gas outlet. The operating gas flow means then comprise wall means disposed inside of the housing, the wall means being configured for dividing a single flow of operating gas entering the housing gas inlet into the first and second gas flows and for routing the first gas flow to the one peripheral region of the turbine wheel and the second gas flow to the opposite peripheral region of the turbine wheel.

Because of the use of two operating gas flows which impinge opposite peripheral regions of the turbine wheel, loads on the turbine wheel, and hence on the turbine-air compressor shaft, are balanced and associated bearings in which the shaft is journaled in the housing are not subject to significant amounts of eccentric loading. This balancing of the loads on the turbine wheel is further enhanced by the use of two symmetrical and symmetrically located air compressors - one on each side of the turbine wheel. As a result of being at the ends of the shaft, bearings can be made smaller in diameter than otherwise possible. In addition, because of the balanced nature of the present turbine-air compressor apparatus, vibrations of the apparatus are reduced to a minimum, thereby additionally improving the operational life of the apparatus and its reliability.

Another benefit of the present invention is that because of its balanced characteristics and because of the elimination of a separate bearing housing typically used on conventional turbochargers, it can be made lighter and at less cost than comparable, known turbochargers.

Although the turbine-air compressor apparatus of the present invention is particularly useful with internal combustion engines such that the operating gas is exhaust gases from the engines, it is to be appreciated that other sources of operating gases, such as steam, could instead be used to advantage.

BRIEF DESCRIPTION OF THE DRAWINGS

The present invention can be more readily understood by a consideration of the following detailed description when taken in conjunction with the accompanying drawings, in which:

FIG. 1 is a simplified pictorial cross sectional diagram of a conventional, prior art gas-operated turbine showing, for comparative purposes, the flow of operating gases impinging on the circumference of a turbine wheel to cause the rotational driving thereof, and causing unbalanced radial and axial loads thereon, the operating gas flowing out in one direction through central regions of one side of the turbine wheel;

FIG. 2 is a longitudinal cross sectional drawing, looking along line 2—2 of FIG. 1, showing a typical prior art turbocharger having a single air compressor and showing the relationship between the turbine and the air compressor and showing typical bearing arrangements supporting the turbine-compressor shaft;

FIG. 3 is a simplified pictorial cross sectional diagram similar to the diagram of FIG. 1 but of the improved, balanced turbine of the present invention, showing two flows of operating gases, the two flows being in opposite directions and impinging on opposite side sectors of a turbine wheel so that radial loads on the turbine wheel are balanced;

FIG. 4 is an exterior perspective drawing of the improved, balanced turbine compressor of the present invention showing air and operating gas inlets and compressed air and operating gas outlets;

FIG. 5 is a longitudinal cross sectional view taken along line 5—5 of FIG. 4 showing a turbine wheel and two air compressor wheels, all of which are mounted to a common turbine-compressor shaft, one compressor wheel being mounted on the shaft to one axial side of the turbine wheel and the other compressor wheel being mounted on the shaft on the other axial side of the turbine wheel, and showing shaft support bearings mounting ends of the turbine-compressor shaft to the apparatus housing;

In the various FIGS. like elements and features are given the same reference number and/or other identification.

DESCRIPTION OF THE PREFERRED EMBODIMENT

Figure 6:
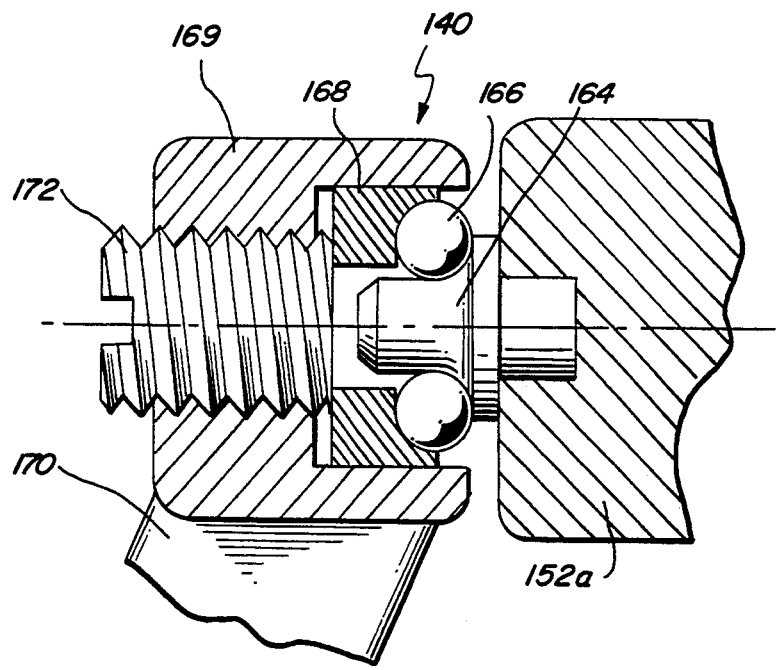
FIG. 6 is a partial longitudinal cross sectional drawing in the plane of FIG. 5, showing one end bearing arrangement.

There is depicted in a simplified, diagram form in FIG. 1 a transverse cross section of an exemplary prior art turbocharger 20 having a turbine wheel 22 mounted on a turbine shaft 24. Also mounted on shaft 24 is a compressor wheel (not shown in this FIG.). As shown schematically, a single flow of operating gas (for example, engine exhaust gas) is directed, through a duct 26, so as to impinge on one peripheral region of turbine wheel 22, causing the wheel to rotate in the direction of Arrow A (that is, in a clockwise direction). The operating gas exits the turbocharger through a central region 23 of turbine wheel 22.

Because the incoming flow of operating gas impinges only one peripheral region of turbine wheel 22 (although the gas may, in fact, flow around or partially around the turbine wheel before it exits the turbocharger), a force, $F_1$, is applied to the turbine wheel and, thereby, to shaft 24, which attempts to push the turbine wheel and shaft to one side. Such an eccentric loading of turbine shaft 24 causes excessive wear of associated shaft bearings (also not shown in this FIG.).

FIG. 2 may be considered to be a longitudinal cross sectional view of turbocharger 20 depicted schematically in FIG. 1. As shown in FIG. 2, turbine wheel 22 is mounted on one end of shaft 24 in a turbine housing section 28 of a turbocharger housing 30. A compressor wheel 36 is mounted on the other end of shaft 24 in a compressor housing section 38 of turbocharger housing 30. Generally central regions of shaft 24 are mounted in axially-separated bearings 40 and 42 inside of a central section 44 of housing 30. Ambient air enters compressor housing section 38 through an axial inlet 46, the outlet for air compressed by compressor wheel 36 not being shown. Operating gas, for example exhaust gas from an associated internal combustion engine, exits turbine housing section 28 through an axial outlet 48, the operating gas inlet not being shown. Turbocharger 20 is depicted as being oil cooled, the oil entering an oil inlet port 54 and exiting through an oil drain port 56, both such ports being in central housing section 44 of housing 30.

From FIG. 2 it can be seen that eccentric force $F_1$ on turbine wheel 22 tries to pivot shaft 24 in the direction of Arrow B, thereby exerting an upward load, $L_1$, on bearing 40 and a downward load, $L_2$, on bearing 42. Such eccentric loading tends to accelerate wear on bearings 40 and 42 and thereby shorten the operating life of turbocharger 20. Moreover, the axial forces on shaft 24 (direction of Arrow "D") caused by the operation of turbine wheel 22 require the use of a thrust bearing 60 against which a thrust collar 62 on the shaft bears.

In contrast to the prior art turbocharger depictions in FIGS. 1 and 2, there is schematically depicted, in a simplified manner, in FIG. 3 a balanced turbo compressor or turbocharger 120 in accordance with the present invention. Turbocharger 120, which is more particularly described below, includes a turbine wheel 122 which is mounted on a shaft 124. Also mounted on shaft 124 are first and second air compressors (not shown in this FIG.). A first inlet duct 126a (corresponding to duct 26, FIG. 1) directs a first flow of operating gas which impinges on one peripheral region of turbine wheel 122 in a manner causing the turbine wheel to rotate in the clockwise direction of Arrow A. Operating gases are discharged from the turbine through a generally open, central region 123 of turbine wheel 122. The first flow of operating gases causes a sideways force, $F_2$, on turbine wheel 122 and, thereby, on shaft 124.

However, in the present invention, a second inlet duct 126b directs a second flow of operating gas to an opposite peripheral region of turbine wheel 122. This second flow of operating gas also causes clockwise rotation of turbine wheel 122, but causes a sideward force, $F_3$, on the turbine wheel and shaft 124 which is in a direction opposite to force $F_2$ caused by the first flow of operating gas. The first and second operating gas flows are selected or adjusted so that the two sideward forces, $F_2$ and $F_3$, on turbine wheel 122 and shaft 124 generally balance out, thereby substantially eliminating sideward loading on associated shaft-mounting bearings (also not shown in this FIG.).

Turbocharger 120 is further depicted in FIG. 4, which is a perspective view of a housing 130 of the turbocharger. As shown in FIG. 4, housing 130 comprises a first compressor housing section 138a, a second compressor housing section 138b, and a turbine wheel housing section 128, the turbine wheel housing section being between the first and second compressor housing sections. Shown on first compressor housing section 138a is a first ambient air inlet 146a and a first compressed air outlet 134a; shown on second compressor housing section 138b is a second ambient air inlet 146b and a second compressed air outlet 134b. An operating gas inlet 150 and an operating gas outlet 148 are shown on turbine wheel housing section 128, the inlet flow of operating gases being divided within such housing section as more particularly described below. Alternatively, a second operating gas inlet and outlet (neither being shown) may be provided such that the dividing of the flow of operating gases may be at least partially provided for outside of housing 130. A cooling water outlet 153 is provided at the top of turbine wheel housing section 128, the corresponding water inlet not being shown.

In FIG. 5 there is shown in longitudinal cross section, a first compressor wheel 136a mounted on a first end region 152a of shaft 124 within first compressor housing section 138a. A second compressor wheel 136b is mounted on a second end region 152b of shaft 124 within second compressor housing section 138b. Turbine wheel 122 is centrally mounted on shaft 124 between first and second compressor wheels 136a and 136b. Compressor wheels 136a and 136b are preferably symmetrically constructed and mounted on the shaft in a symmetrical manner relative to turbine wheel 122 to provide balanced axial loads on the turbine shaft 124 during operation of turbocharger 120. A thermal barrier, preferably a water jacket 157, is provided in turbine housing portion 128.

Respective first and second end regions 152a and 152b of shaft 124 are rotationally mounted in respective first and second bearing means 140 and 142 which may be alike or which may be different from one another. Shown in the enlarged drawing of FIG. 6 is one manner in which bearing means 140 (and/or 142) may be implemented. As shown in such FIG., bearing means 140 comprises a hard bearing tip 164 which is mounted to shaft end of shaft end region 152a. Tip 164 may, for example, be constructed of steel or other hard, wear-resisting material. A bearing 166 is mounted in a bearing housing 168 which is axially installed in an end region 169 of an internal structural support 170 of first compressor housing section 130. Shaft tip 164 may be installed into the inner race of bearing 166 or, preferably, may itself form an inner race of the bearing. Axial adjustment of bearing housing 168, and thus of bearing 166, is provided by a screw 172 which extends axially through an end region of support portion 169. Instead of (or in addition to) axial adjustment screw 172, an axial compression spring 174 (FIG. 5) may be mounted in opposite bearing means 142 to provide a proper pre-load on the bearings.

Figure 7:
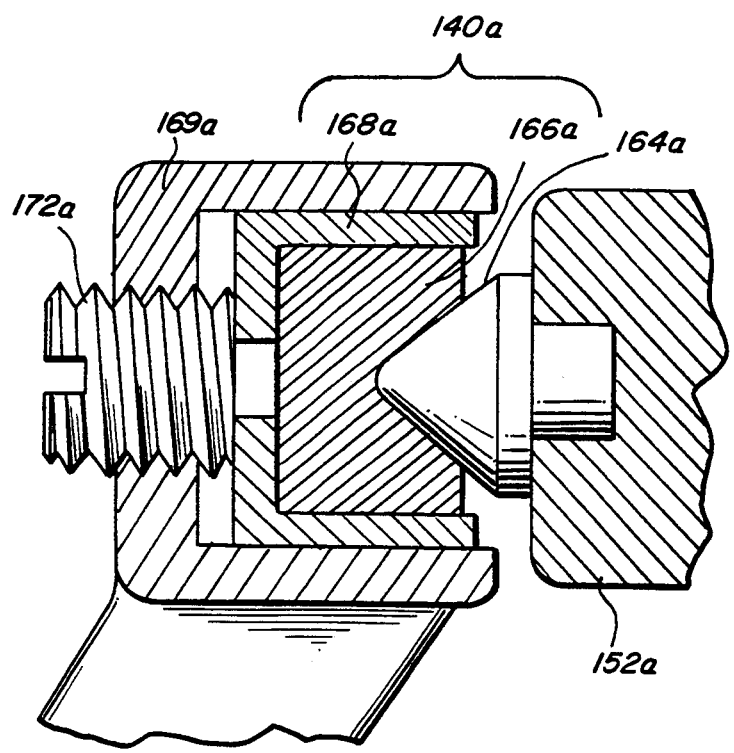
FIG. 7 is a partial longitudinal cross sectional drawing in the plane of FIG. 6, showing a variation end bearing arrangement; and, FIG. 8 is a simplified transverse cross sectional diagram looking along line 8—8 of FIG. 5 showing a preferred arrangement of the internal ducting of operating gases to opposite side regions of the turbine wheel.

An alternative bearing means 140a is depicted in FIG. 7. As shown, bearing means 140a comprises a shaft tip 164a mounted in shaft end region 152a. Instead of bearing 166, there is provided a super-hard element 166a into which shaft tip 164a is received. Tip 164a may, for example, be constructed of silicon carbide, ceramic, sapphire, diamond, or other hard, wear-resistant material. Element 166a may be constructed of a metallic or a self-lubricating polymer or other non-metallic material. Element 166a is axially mounted in housing 168a, which, as above-described, is mounted in support end region 169a. Screw 172a provides axial adjustment of bearing housing 168a, and thus of element 166a. Spring 174 at the opposite bearing 142 may be used to pre-load the bearings.

Figure 8:
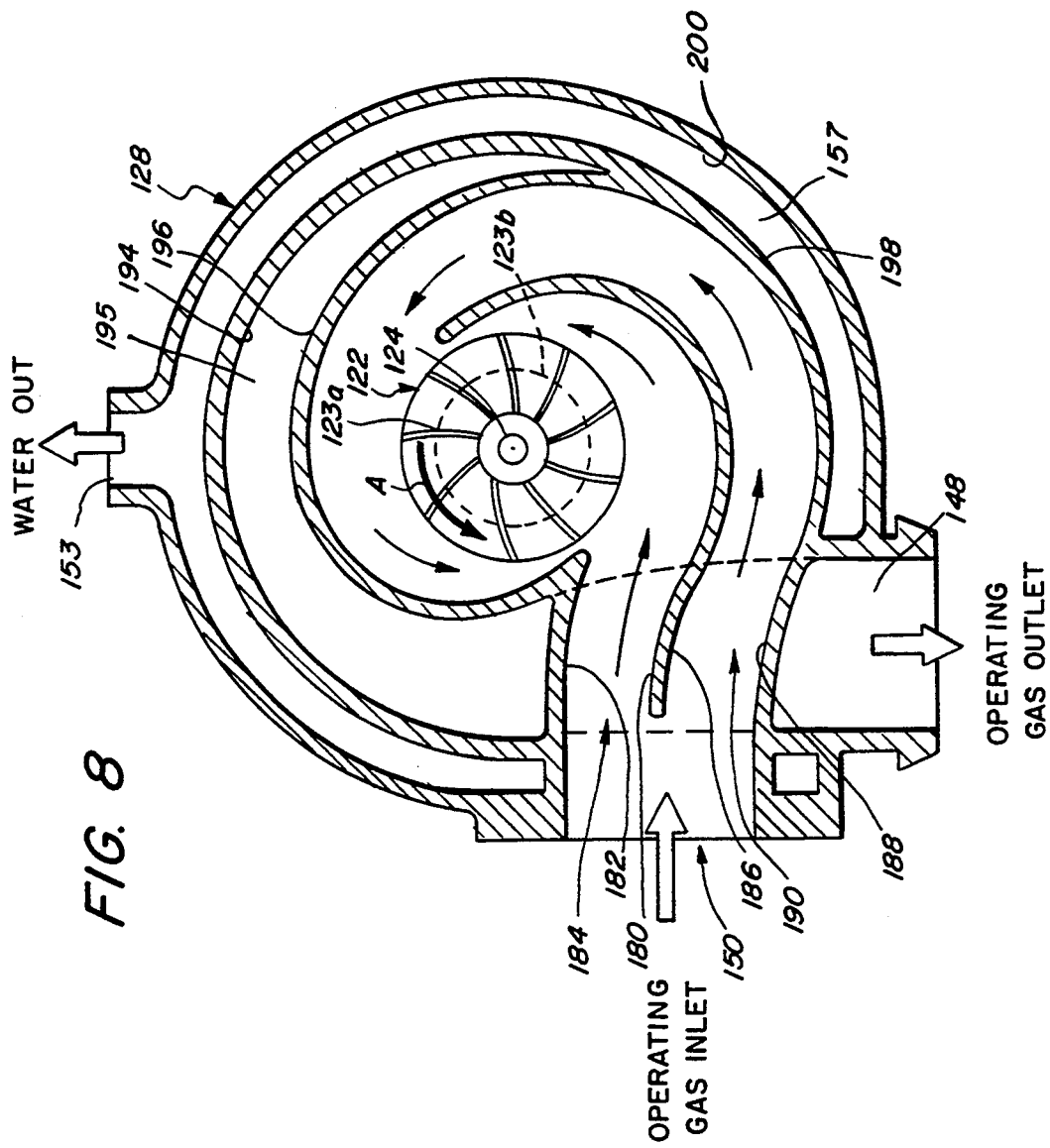

FIG. 8 corresponds generally to FIG. 3, but depicts one manner in which turbine wheel housing section 128 is internally constructed to divide a main flow of operating gas into first and second flows of operating gas to cause the operation of turbine wheel 122. Internal walls 180 and 182 define a first duct 184 for the first flow of operating gas and internal walls 186 and 188 define a second duct 190 for the second flow of operating gas. As can be seen, a common flow of operating gas entering housing section 128 through inlet 150 is divided by walls 180, 182, 186 and 188 into the first and second flows of gas, each of which impinges turbine wheel 122 on opposite peripheral regions thereof. Both of the resulting sub-flows of operating gases cause turbine wheel 122 to rotate in the counterclockwise direction of Arrow A.

The two sub-flows of operating gas flow through open regions 123a and 123b of turbine wheel 122 and out of housing section 128 through a discharge passageway 192 defined on FIG. 8 by housing inner walls 194 and 196. Operating gas flowing through discharge passageway 195 exits housing section 128 through outlet port 148.

Cooling water chamber 157 is defined by housing inner walls 198 and 200.

Because of the balanced forces on turbine wheel 122 caused by the two flows of operating gas and because of the symmetrical arrangement of first and second compressor wheels 136a and 136b, respectively, loads other than rotational loading on shaft 124 are eliminated or substantially reduced over that which would be experienced in conventional turbochargers of a comparable size, thereby extending the life of bearing means 140 and 142 beyond that which would otherwise be expected and providing for a smooth, relatively vibration-free turbocharger 120. The configuration of turbocharger 120 also enables a lightweight rotating assembly (that is, turbine wheel 122, compressor wheels 136a and 136b, and common shaft 124). This lighter weight enables quicker response of turbocharger 120 and less frictional losses in bearings as compared to conventional, existing turbochargers (such as depicted in FIGS. 1 and 2).

Although there is described above a specific arrangement of a balanced turbocharger in accordance with the present invention for the purpose of illustrating the manner in which the invention can be used to advantage, it is to be appreciated that the invention is not limited thereto. Accordingly, any and all variations and modifications which may occur to those skilled in the art are to be considered to be within the scope and spirit of the invention as defined by the appended claims.

What is claimed is:

1. A combination turbine and air compressor apparatus, said apparatus comprising:
   a. a turbine-air compressor housing, said housing having at least one air inlet, at least one pressurized air outlet, at least one operating gas inlet, and at least one operating gas outlet;
   b. a turbine-air compressor shaft journaled for rotation in said housing about a longitudinal shaft axis;
   c. a turbine wheel fixed to said turbine-air compressor shaft for causing the rotation thereof about said shaft axis, said turbine wheel being disposed within said housing intermediate said at least one operating gas inlet and at least one operating gas outlet;
   d. air compressor means fixed to said turbine-air compressor shaft for rotation with said turbine wheel and shaft about said shaft axis, said air compressor means being disposed within said housing for receiving air from said at least one housing air inlet and for providing pressurized air to said at least one compressed air outlet; and
   e. operating gas flow means for directing a first flow of operating gas to one peripheral edge region of said turbine wheel and for directing a second flow of operating gas to the opposite peripheral region of said turbine wheel such that the two flows of operating gas impinge upon different peripheral edge regions of said turbine wheel, said operating gas flow means causing said first and second flows of operating gas to impinge on the turbine wheel in a manner causing the turbine wheel to rotate in the rotational direction which causes air flowing into said at least one housing air inlet to be compressed by said air compressor means and to be delivered thereby to said at least one housing compressed air outlet.

2. The combination turbine and air compressor apparatus as claimed in claim 1, wherein said housing includes first and second air inlets and first and second compressed air outlets, and wherein said air compressor means comprise first and second air compressors, said first air compressor being fixed to said turbine-air compressor shaft to one axial side of said turbine wheel in air flow communication with said first air inlet and first compressed air outlet and second air compressor being fixed to the turbine-air compressor shaft on the other axial side of the turbine wheel in air flow communication with said second air inlet and second compressed air outlet.

3. The combination turbine and air compressor apparatus as claimed in claim 2, wherein said first and second air compressors are shaped symmetrically relative to one another and are fixed to said turbine-air compressor shaft symmetrically relative to said turbine wheel.

4. The combination turbine and air compressor apparatus as claimed in claim 1, wherein said housing includes a single operating gas inlet and a single operating gas outlet; wherein said operating gas flow means comprise wall means disposed inside of said housing, said wall means being configured for dividing a single flow of operating gas entering said housing gas inlet into said first and second gas flows and for routing said first gas flow to said one peripheral region of said turbine wheel and said second gas flow to said opposite peripheral region of said turbine wheel.

5. A combination turbine and air compressor apparatus, said apparatus comprising:
   a. a turbine-air compressor housing, said housing having at least one air inlet, at least one pressurized air outlet, an operating gas inlet, and an operating gas outlet;
   b. a turbine-air compressor shaft journaled for rotation in said housing about a longitudinal axis of said shaft;
   c. a turbine wheel fixed to said turbine-air compressor shaft for causing the rotation thereof about said shaft longitudinal axis, said turbine wheel being disposed within said housing intermediate said housing operating gas inlet and operating gas outlet;
   d. air compressor means fixed to said turbine-air compressor shaft for rotation with the turbine wheel and shaft about the shaft longitudinal axis, said air compressor means being disposed within said housing for receiving air from said at least one housing air inlet and for providing pressurized air to said at least one compressed air outlet; and
   e. wall means disposed within said housing for directing a first gas sub-flow from a main flow of operating gas delivered to said operating gas inlet of the housing to one peripheral edge region of said turbine wheel and for directing a second gas sub-flow from said main flow of operating gas to a different, opposite peripheral region of said turbine wheel such that the two flows of operating gas do not impinge upon the same peripheral edge region of the turbine wheel at the same time, said wall means causing said first and second sub-flows of operating gas to impinge the turbine wheel in a manner causing the turbine wheel to rotate in a rotational direction which causes air flowing into said at least one housing air inlet to be compressed by said air compressor means and to be delivered thereby to said at least one compressed air outlet.

6. The combination turbine and air compressor apparatus as claimed in claim 5, wherein said housing includes first and second air inlets and first and second compressed air outlets, and wherein said air compressor means comprise first and second air compressors, said first air compressor being fixed to said turbine-air compressor shaft to one axial side of said turbine wheel in air flow communication with said first air inlet and said first compressed air outlet and said second air compressor being fixed to the turbine-air compressor shaft on the other axial side of the turbine wheel in air flow communication with said second air inlet and second compressed air outlet.

7. The combination turbine and air compressor apparatus as claimed in claim 6, wherein said first and second air compressors are shaped symmetrically relative to one another and are fixed to said turbine-air compressor shaft symmetrically relative to said turbine wheel.

8. A combination turbine and air compressor apparatus, said apparatus comprising:
   a. a turbine-air compressor housing, said housing having first and second air inlets, corresponding first and second compressed air outlets, at least one operating gas inlet, and at least one operating gas outlet;
   b. a turbine-air compressor shaft journaled for rotation in said housing, said shaft having a longitudinal axis of rotation;
   c. a turbine wheel fixed to said turbine-air compressor shaft in a generally central region thereof so as to rotate therewith about said longitudinal axis of rotation, said turbine wheel being disposed within said housing in gas flow communication with said at least one operating gas inlet and said at least one operating gas outlet;
   d. air compressor means fixed to said turbine-air compressor shaft for rotation in unison with the turbine wheel and shaft about the shaft longitudinal axis of rotation, said air compressor means comprising first and second air compressors, said first air compressor being fixed to said turbine-air compressor shaft on one axial side of said turbine wheel in air flow communication with said first air inlet and said first compressed air outlet and said second air compressor being fixed to the turbine-air compressor shaft on the other axial side of the turbine wheel in air flow communication with said second air inlet and said second compressed air outlet; and
   e. operating gas flow means for directing a first flow of operating gas from said at least one operating gas inlet to one peripheral edge region of said turbine wheel and for directing a second flow of operating gas from said at least one operating gas inlet to a different, opposite peripheral region of said turbine wheel such that the two flows of operating gas do not impinge the same peripheral edge region of the turbine wheel at the same time, said operating gas flow means causing said first and second flows of operating gas to impinge on the turbine wheel in a manner causing the turbine wheel to rotate in the rotational direction about the shaft longitudinal axis which causes air flowing into said housing first and second air inlets to be compressed by said first and second air compressors and to be delivered thereby to said first and second housing compressed air outlets.

9. The combination turbine and air compressor apparatus as claimed in claim 8, wherein said first and second air compressors are shaped symmetrically relative to one another and are fixed to said turbine-air compressor shaft symmetrically relative to said turbine wheel.

10. The combination turbine and air compressor apparatus as claimed in claim 8, wherein said housing includes a single operating gas inlet and a single operating gas outlet and wherein said operating gas flow means comprise walls disposed inside of said housing, said wall means being configured for dividing a single flow of operating gas entering said single gas inlet into said first and second gas flows and for routing said first gas flow to said one peripheral edge region of said turbine wheel and said second gas flow to said different, opposite peripheral edge region of said turbine wheel.

11. A turbo compressor comprising:
   a. a turbine-air compressor housing, said housing having first and second air inlets, corresponding first and second compressed air outlets, at least one operating gas inlet and at least one operating gas outlet;
   b. a turbine-air compressor shaft and shaft bearings mounted in the housing for rotatably mounting the shaft for rotation about a longitudinal axis of the shaft;
   c. a turbine wheel fixed to generally central regions of said turbine-air compressor shaft for causing the rotation of said shaft about its longitudinal axis, said turbine wheel being disposed within said housing intermediate said at least one operating gas inlet and said at least one operating gas outlet;
   d. air compressor means fixed to said turbine-air compressor shaft for rotation in unison with the turbine wheel about the shaft longitudinal axis, said air compressor means comprising first and second air compressors, said first air compressor being fixed to said turbine-air compressor shaft to one axial side of said turbine wheel in air flow communication with said first air inlet and said first compressed air outlet, and said second air compressor being fixed to the turbine-air compressor shaft on the other axial side of the turbine wheel in air flow communication with said second air inlet and said second compressed air outlet, said first and second air compressors being shaped symmetrically relative to one another and being fixed to said turbine-air compressor shaft symmetrically relative to said turbine wheel; and
   e. operating gas flow means for directing a first flow of operating gas from said at least one operating gas inlet to one peripheral edge region of said turbine wheel and for directing a second flow of operating gas from said at least one operating gas inlet to a different, opposite peripheral edge region of said turbine wheel, said operating gas flow means causing said first and second flows of operating gas to impinge on the turbine wheel in a manner causing the turbine wheel to rotate about said shaft longitudinal axis in the rotational direction which causes air flowing into said housing first and second air inlets to be compressed by said first and second air compressors and to be delivered thereby to corresponding ones of said first and second housing compressed air outlets, said operating gas flow means comprising wall means disposed inside of said housing, said wall means being configured for dividing a single flow of operating gas entering said at least one gas inlet into said first and second gas flows and for routing said first gas flow to said one peripheral edge region of said turbine wheel and said second gas flow to said opposite peripheral edge region of said turbine wheel.

12. The combination turbine and air compressor apparatus as claimed in claim 11, wherein said operating gas is exhaust gas from an internal combustion engine.

* * * * *